United States Patent

[11] 3,570,513

| [72] | Inventors | T. O. Paine<br>Deputy Administrator the National Aeronautics, and Space Administration with respect to an invention of;<br>Richard J. Salvinski, Hacienda Heights;<br>Owen O. Fiet, Redondo Beach, Calif. |
|---|---|---|
| [21] | Appl. No. | 754,020 |
| [22] | Filed | Aug. 20, 1968 |
| [45] | Patented | Mar. 16, 1971 |

[54] ELECTROHYDRODYNAMIC CONTROL VALVE
9 Claims, 3 Drawing Figs.

| [52] | U.S. Cl. | 137/81.5 |
|---|---|---|
| [51] | Int. Cl. | F15c 1/04 |
| [50] | Field of Search | 137/81.5 |

[56] References Cited
UNITED STATES PATENTS

| 3,071,154 | 1/1963 | Cargill et al. | 137/81.5 |
| 3,144,037 | 8/1964 | Cargill et al. | 137/81.5 |
| 3,263,695 | 8/1966 | Scudder et al. | 137/81.5 |
| 3,266,514 | 8/1966 | Brooks | 137/81.5 |
| 3,390,692 | 7/1968 | Hastie et al. | 137/81.5 |
| 3,390,693 | 7/1968 | Ziemer et al. | 137/81.5 |
| 3,395,720 | 8/1968 | Brooks | 137/81.5 |
| 3,438,384 | 4/1969 | Hurvitz | 137/81.5 |

*Primary Examiner*—Samuel Scott
*Attorney*—Paul F. McCaul

ABSTRACT: An electrohydrodynamic control valve is disclosed. The valve includes a first inlet for forming a jet of noncharged fluid and a plurality of fluid receiving apertures downstream from the inlet jet. The jet is selectively deflected toward one of the apertures by impressing an electric field of predetermined intensity along the length of the jet. The valve may further include at least one pair of oppositely diverging channels disposed between the jet and the apertures. These channels are adapted to lock the flow of the jet along the wall thereof by means of the Coanda effect.

Patented March 16, 1971

3,570,513

INVENTORS
RICHARD J. SALVINSKI
OWEN O. FIET
BY
*J. H. Warden*
*G. H. McCoy*

ATTORNEYS

ELECTROHYDRODYNAMIC CONTROL VALVE

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

1. Field of the Invention

The present invention relates to electrohydrodynamically controlled fluid devices and more particularly to a value in which a main stream of fluid is switched from one stable position to another by means of electrohydrodynamic forces.

2. Description of the Prior Art

Recently, a variety of fluid logic elements have been developed which have no moving parts other than the fluid itself. Each such logic element is normally small and inexpensive and can withstand extended service under demanding conditions. Multiple elements may be combined into logic systems for performing industrial control, machinery control or the like. Although most applications involve controlling the elements in response to fluid control signals, some applications require that the elements be responsive to electrical control signals. For example, where fluid logic elements are used in military homing guidance systems, they are typically responsive to electronic sensors, such as radio apparatus or underwater sound apparatus. In such an application, it has been necessary to provide an intermediate conversion of the electrical signal to a fluid signal. This intermediate conversion required very intricate valving schemes which had to be manufactured with great precision and at great cost. This has severely limited the use of hybrid control systems.

OBJECTS AND SUMMARY OF THE INVENTION

It is therefore an object of the invention to provide a fluid control system that can be readily switched from one output channel to another by direct electrical means.

Yet another object of the invention is the provision of a device in which an electrical signal is utilized to produce a selected fluid output signal, said device being simple, reliable over extended periods of service, and inexpensive to manufacture.

Other objects and many of the intended advantages of the invention will become readily appreciated as the description proceeds.

The valve of the invention includes nozzle means for providing a jet of fluid, a plurality of fluid receiving apertures disposed downstream from the nozzle and means for impressing an electric field of predetermined intensity along the length of the jet to selectively deflect the jet to one of the apertures. The valve may further include at least one pair of oppositely diverging walls intermediate the apertures and the jet for locking the jet onto either wall by means of the Coanda effect.

The invention will become better understood by reference to the following detailed description when considered in connection with the accompanying drawings.

DESCRIPTION OF THE PREFERRED EMBODIMENT

Figure 1:
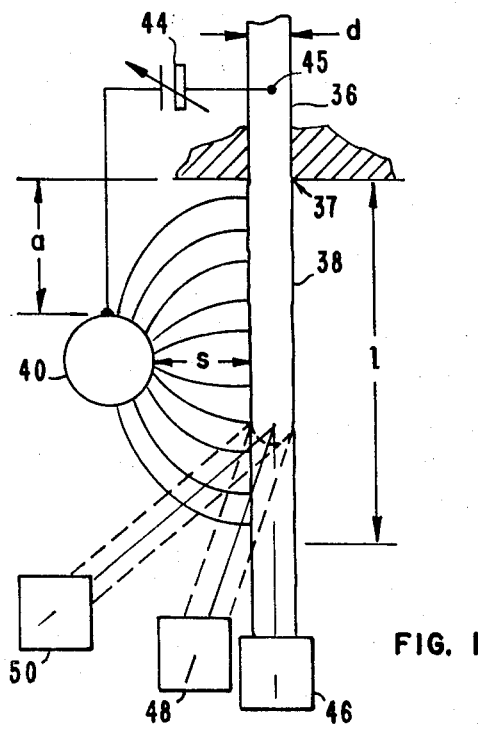
FIG. 1 is a schematic view of an embodiment of an electrohydrodynamic fluid jet control or switching device according to the invention.

Referring now to the embodiment of the invention shown in FIG. 1, a length of metal tubing 36 is provided having a diameter $d$. The tubing 36 is connected to a constant head pressurized reservoir (not shown). The end of the tubing 36 defines a nozzle 37 for the liquid jet 38 emanating from the tubing. A cylindrical copper electrode 40 is mounted on a block transverse to the jet 38 at a distance $s$, of approximately 1 cm. from the jet. A variable 30 kilovolt power supply 44 is connected to the electrode and is grounded to the tubing at 45. This provides an electric field with maximum supply voltage of 30 kilovolts between the electrode and the liquid jet. A series of jet receiving channels 46, 48 and 50 are disposed downstream from the jet 38 at positions corresponding to deflections of 0°, 30° and 60°, respectively.

The switching apparatus of FIG. 1 was operated with the electrode flush with the nozzle 37 and at a distance $a$, 0.625 inches downstream from the nozzle. Water as a representative, polar liquid and isopropyl alcohol as a representative nonpolar liquid were pressurized and the deflection angles of the jet were measured in both electrode positions for constant mass flow rates of from about 3 to 12 grams per second. These fluids forming the jets are relatively nonconductive and are uncharged and unionized as they leave the nozzle. The field is not, therefore, believed to act on individual molecules but on a dielectric Gaussian surface body. The jets were deflected by the field up to angles of 60° from the axis of the tubing. It was also determined that at each constant mass flow rate, there was a critical value of the voltage at which point the liquid jet exhibited unstable oscillatory motion due to surface tension effects. Surface waves were formed on the jet and droplets that were torn off were accelerated toward the electrode. These drops formed an electric path which resulted in arcing. Switching or control devices according to the invention must be operated at below this voltage so that the jet stream is deflected as an integral body without arcing which can destroy the apparatus and create a danger to operating personnel.

The jet deflection data is presented in Tables I and II that follow:

TABLE I.—WATER DEFLECTION TESTS

Electrode Flush With Nozzle

| Run No.: | Voltage (kv.) | Deflection angle (degrees) | Mass flow (gms./sec.) |
|---|---|---|---|
| 1 | 8.5 | 10 | 4.33 |
|  | 10.5 | 20 |  |
|  | 12.3 | 30 |  |
|  | 13.5 | 40 |  |
|  | 14.5 | 50–60 (unstable) |  |
| 2 | 23.5 | 5 | 11.67 |
| 3 | 21.0 | 5 | 9.17 |
| 4 | 15.3 | 10 | 7.0 |
| 5 | 11.8 | 10 | 6.0 |
|  | 17.0 | 15 |  |

Electrode ⅝ inch downstream from nozzle

| 1 | 12.8 | 5 | 12.67 |
| 2 | 12.0 | 10 | 9.17 |
|  | 9.0 | 5 |  |
| 3 | 5.2 | 5 | 5.83 |
|  | 7.8 | 10 |  |
|  | 11.0 | 20 |  |
|  | 13.7 | 30 |  |
| 4 | 6.8 | 10 | 4.83 |
|  | 8.9 | 20 |  |
|  | 10.7 | 30 |  |
|  | 11.9 | 40 |  |
|  | 12.5 | 50 |  |
|  | 13.3 | 60 |  |

TABLE II.—ALCOHOL DEFLECTION TESTS

Electrode flush with nozzle

| Run No.: | Voltage (kv.) | Deflection angle (degrees) | Mass flow (gms./sec.) |
|---|---|---|---|
| 1 | 4.2 | 10 | 2.67 |
|  | 5.5 | 20 |  |
|  | 6.6 | 30 |  |
|  | 9.3 | 40 |  |
|  | 10.7 | 50 |  |
|  | 12.2 | 60 |  |
| 2 | 10.5 | 10 | 5.0 |
|  | 15.3 | 15 |  |
| 3 | 6.3 | 5 | 8.0 |
|  | 16.2 | 5 |  |

TABLE II.—ALCOHOL DEFLECTION TESTS—Continued

| | Electrode ⅝ inch downstream from nozzle | | |
|---|---|---|---|
| 1 | 4.1 / 5.3 / 6.4 / 7.3 / 8.5 / 9.5 | 10 / 20 / 30 / 40 / 50 / 60 | 3.16 |
| 2 | 9.5 / 15.0 | 5 / 10 | 7.67 |
| 3 | 12.7 | 5 | 9.167 |

The force on the liquid jet is due both to the action of the applied and induced fields. The deflection force attributable to the induced electric field is a function of the applied field and the dielectric constant of the material. The force exerted on the jet by the applied field is dependent on several parameters. Most importantly for control design criteria, it depends on the dielectric constant of the liquid, the charge density, the length of the jet $1$ which is acted on by the applied field, the cross-sectional area or diameter $d$ of the jet and the liquid density. The ratio of this length to diameter $1/d$ can be considered the nondimensionalized interaction length and can be used to locate the electrode with respect to the jet stream and to optimize electrode geometry. The interaction chamber of the valve must be at least the length $1$ to allow sufficient force to act on the liquid jet and to permit deflection from one channel to another.

Figure 2:
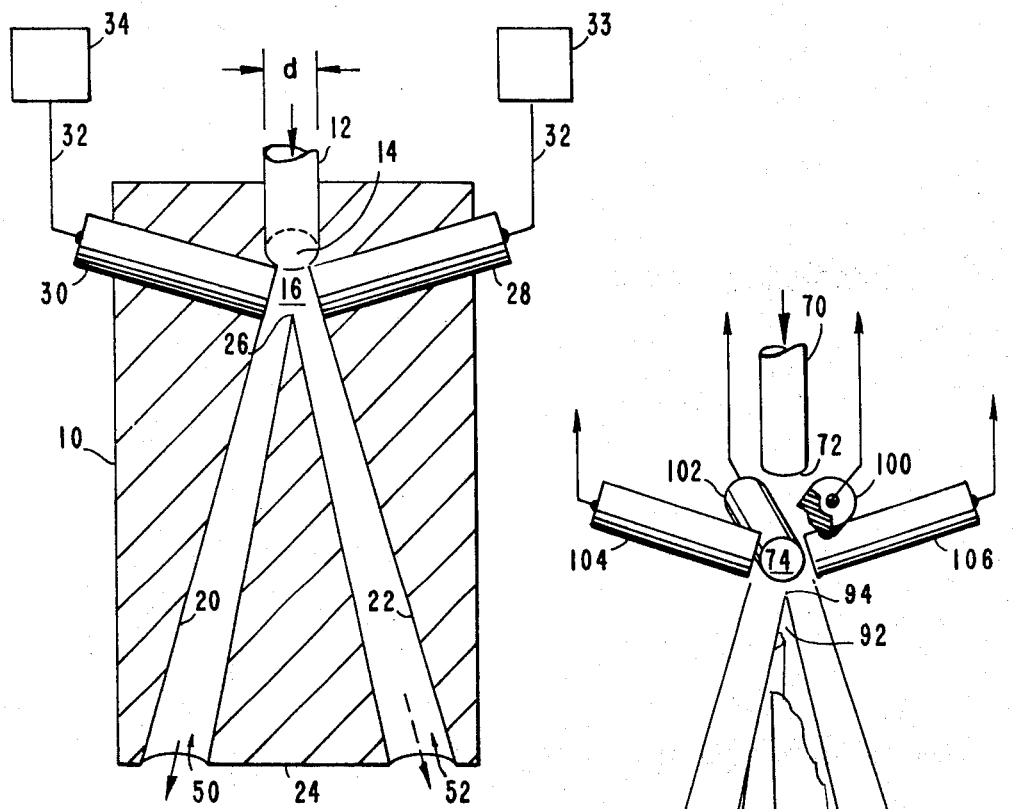
FIG. 2 is a cross-sectional view of a bistable valve according to the invention.

Referring now to FIG. 2, bistable valve according to the invention to illustrated. The valve includes a body 10 in which a first channel 12 having a diameter $d$ is provided for receiving a flow of liquid under pressure. Channel 12 terminates inside the body 10 in a fluid jet forming nozzle 14 which delivers the jet to an axially disposed interaction chamber 16. The chamber 16 has a minimum interaction length, $1$, as discussed above. Downstream from the chamber 16, a diverging channel is provided having a pair of sidewalls 20 and 22. A converging divider 24 is mounted within the diverging channel. The apex 26 of the divider 24 terminates below the interaction chamber 16. A pair of electrodes 28 and 30 are mounted in recesses provided in the body 10 on each side of the interaction chamber so as to present their end faces substantially parallel to sidewalls 20 and 22. The electrodes 28 and 30 are each connected by means of leads 32 to a variable source of potential 33 and 34.

In operation of the bistable valve of the invention, a fluid jet emanates from the nozzle 14 and impinges on the apex 26 of the divider 24. Even if the divider is disposed axially with respect to the jet, an initial turbulent condition about the divider in the region of the interaction chamber will cause the jet to deflect and become attached to either of the sidewalls 20 or 22. The fluid jet is in a stable condition and substantially all of the fluid will flow through a single channel and out the aperture 50 or 52 defined between the end of the channel and the divider. This entrainment is known as the Coanda effect caused by a region of reduced pressure which is formed between the wall and the jet. The entrainment of this low pressure bubble makes the jet stable in its locked-on condition. Assuming that the jet is locked onto wall 22, the flow of the jet can be turned to the opposite channel and attached to the opposite wall 20 by applying a voltage to the opposite electrode 34. It should be noted that the applied voltage is only necessary during the liquid switching operation and the jet is deflected as a cylindrical body, not as droplets.

A bistable valve according to FIG. 2 was fabricated from acrylic resin and copper electrodes were inserted into the recesses approximately normal to the liquid jet. The electrodes were independently connected to a 30 kv. DC voltage supply and water was supplied to the inlet channel from a spherical plenum chamber pressurized by gaseous nitrogen. At moderate flow rates, the valve functioned satisfactorily. The flow could be switched by an electric field pulse and remain attached to the wall of either channel via the Coanda effect. By applying a voltage pulse to the opposite electrode, the flow was turned and attached to the wall of the opposite channel. In one run, the critical voltage was exceeded and the field arced through the liquid jet burning the edges of the valve body and destroying the equipment. The arcing voltage should not be exceeded during operation of the device.

Figure 3:
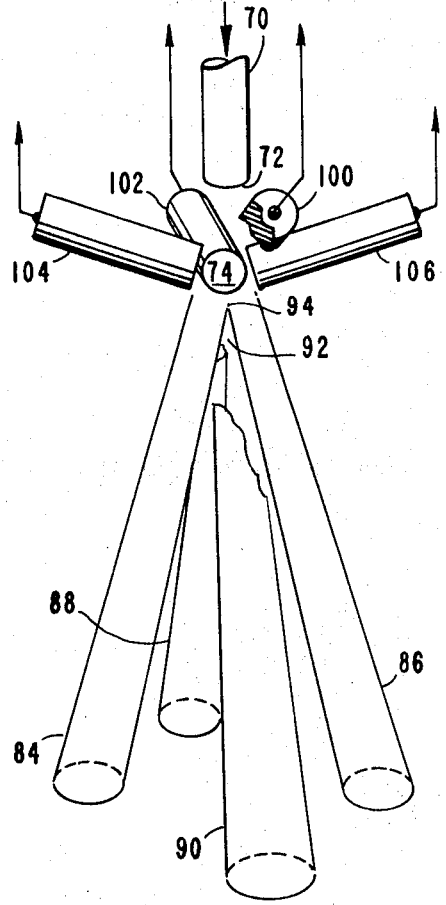
FIG. 3 is a perspective view of a valve having four stable modes.

FIG. 3 illustrates a valve having four stable conditions and outputs. A length of input tubing 70 terminates in a jet forming nozzle 72.

An interaction chamber 74 is provided downstream of the nozzle 72. Four converging tubes 84, 86, 88 and 90 are connected to the interaction chamber 74. The inside surfaces of the tubes are joined into a converging flow divider 92 having an apex 94 which terminates at the downstream end of the interaction chamber 74.

The tubes are preferably divided into opposite sets such as tubes 84 and 86 and tubes 88 and 90. Each tube in each set preferably diverges equally from the apex 94. A set of four planes through the centers of the four tubes then defines a pyramid.

A set of four electrodes 100, 102, 104 and 106 are disposed around the interaction chamber. Each electrode presents a face substantially parallel to a plane through the center of a tube. As each electrode is energized, an electric field will be created with lines of force orthogonal to the jet as it traverses the chamber 74 and the electrohydrodynamic force applied will attract the jet as a body toward the wall of the opposite tube. The jet will impinge on the inner far wall of the tube and flow out the aperture defined at the end of the tube. The jet will remain locked to this wall until one of the other electrodes is energized to deflect the jet toward a selected one of the other tubes.

In gravitational situations, the down electrode may not be required. If the inertial force of the jet is not sufficient to allow the jet to lock onto the left, right or up channels, the upward channel electrode can be continuously energized an amount sufficient to balance the gravitational force. Removal of all power will switch the electrode to the down channel. The valve may be operated in any one of the four stable modes by means of an initial electrical pulse to create a field to switch and lock the fluid jet onto a selected channel.

It is evident that the valves of the invention are capable of performing logic control functions without the use of mechanical parts. Valves are simple, compact and reliable and can achieve fast and reliable control of a fluid jet with low input of electrical energy. The fluid elements of the invention are readily adaptable to the electronic system control and/or readout devices since the actuating switching means is electrical in nature.

It is to be realized that only preferred embodiments of the invention have been described and that numerous substitutions, alterations and modifications are permissible without departing from the spirit and scope of the invention as defined in the following claims.

We claim:

1. An electrohydrodynamic device for switching a jet of noncharged and nonionized liquid as a body comprising:
   nozzle means for producing a jet of said noncharged and nonionized liquid along an axial path;
   a chamber having an inlet end receiving said jet and an outlet end;
   a plurality of output channels disposed adjacent the outlet end of said chamber means; and
   electric field means disposed on the sides of said chamber for developing an electrostatic field having lines of force orthogonal to said axis and of predetermined intensity for developing a deflection force due to applying said field to said jet and for inducing a field therein sufficient to deflect said jet as a body to a selected output channel without arcing or disruption of liquid from said jet.

2. A liquid control device according to claim 1 in which four symmetrically spaced branch conduits converge at the downstream side of said chamber housing.

3. A liquid control device according to claim 1 further including housing means including a first recess defining said chamber disposed along the axis of the nozzle means for receiving said jet and said plurality of output channels includes a plurality of diverging branch conduits communicating with said chamber.

4. A liquid control device according to claim 3 in which a first and second branch conduit comprise a first and second diverging wall and a converging flow divider disposed therebetween.

5. A liquid control device according to claim 2 in which said liquid is relatively nonconducting and wherein said electric field means includes a first and second electrode and said housing means includes a second and third recess disposed adjacent opposite sides of said chamber for receiving said electrodes.

6. A method of switching a noncharged and nonionized stream of liquid comprising the steps of:
   forming a noncharged and nonionized jet of said liquid;
   projecting the jet axially;
   applying orthogonal to said projected jet an electric field of an intensity sufficient to apply said field to said jet and induce a field therein to develop a force sufficient to deflect said jet as a body without arcing of the field or disrupting liquid from the jet; and
   collecting the deflected jet.

7. A method according to claim 6 in which a pair of oppositely diverging output channels are disposed downstream from said jet and said jet is deflected to one of said channels by energizing an electrode disposed along the length of said jet to create a sufficient orthogonal electric field to deflect said jet to said channel without arcing of the field or disrupting liquid from said jet.

8. A method according to claim 7 in which the liquid is relatively nonconducting and the jet is deflected from 10 to 60° from the axis of the jet.

9. A method according to claim 7 in which the liquid is selected from the group consisting of water and alcohol.

Notice of Adverse Decision in Interference

In Interference No. 98,097, involving Patent No. 3,570,513, T. O. Paine, Deputy Administrator, The National Aeronautics and Space Administration with respect to an invention of R. J. Salvinski and O. O. Fiet, ELECTROHYDRODYNAMIC CONTROL VALVE, final judgment adverse to the patentees was rendered Nov. 30, 1976, as to claims 1, 3, 4, 6 and 7.

[*Official Gazette May 3, 1977.*]